United States Patent
Karch

[11] Patent Number: 5,520,068
[45] Date of Patent: May 28, 1996

[54] BRAKE ARRANGEMENT AND COMPENSATING ROLLER

[75] Inventor: Rudi Karch, Ludwigshafen, Germany

[73] Assignee: Deere & Company, Moline, Ill.

[21] Appl. No.: 381,795

[22] Filed: Feb. 1, 1995

[30] Foreign Application Priority Data

Feb. 26, 1994 [DE] Germany .................. 44 06 384.9

[51] Int. Cl.⁶ .................. G05G 1/14; B60T 7/04
[52] U.S. Cl. .................. 74/512; 74/560
[58] Field of Search .................. 74/512, 516, 518, 74/560

[56] References Cited

U.S. PATENT DOCUMENTS

| | | | |
|---|---|---|---|
| 3,646,831 | 3/1972 | Janosi | 74/518 |
| 3,678,779 | 7/1972 | Janosi | 74/518 X |
| 3,766,802 | 10/1973 | Shellhause | 74/512 |
| 3,769,852 | 11/1973 | Peifer et al. | 74/512 |
| 3,988,945 | 11/1976 | Fasano | 74/560 X |
| 4,404,803 | 9/1983 | Steffes . | |

FOREIGN PATENT DOCUMENTS

| | | | |
|---|---|---|---|
| 229350 | 7/1987 | European Pat. Off. | 74/512 |
| 2208543 | 9/1973 | Germany | 74/512 |
| 2930752 | 1/1981 | Germany . | |
| 3837650 | 5/1990 | Germany . | |
| 84248 | 5/1982 | Japan | 74/518 |
| 29550 | 2/1984 | Japan | 74/516 |
| 1449407 | 1/1989 | U.S.S.R. | 74/512 |
| 2052691 | 1/1981 | United Kingdom | 74/512 |

*Primary Examiner*—Rodney H. Bonck
*Assistant Examiner*—Mary Ann Battista

[57] ABSTRACT

A compensator couples a brake lever to a master cylinder piston. The compensator is configured as roller which has a pair of circular disks on opposite sides of a central body. A recess is formed in the brake lever and is open towards the master cylinder piston. The central body of the compensator is a movably received in the recess. The pair of disks are fixed to opposite sides of the body and the disks are engagable with an end face of the master cylinder piston. A portion of the brake lever is positioned between the disks and the distance between the disks is larger than a width of the portion of the brake lever. The central body has a spherical outer surface which is engagable with the brake lever. The compensator is preferably concentric about a central axis.

9 Claims, 1 Drawing Sheet

5,520,068

BRAKE ARRANGEMENT AND COMPENSATING ROLLER

BACKGROUND OF THE INVENTION

The invention relates to a brake arrangement for motor vehicles with a brake lever supported by bearings for rotation about a pivot axis, an axially movable master cylinder piston and a compensator that transmits force between the lever and the master cylinder piston.

A brake lever and a two-stage master cylinder are known from DE-A-38 37 650. The master cylinder piston is loaded axially by a spring in the cylinder bore so that its end face protruding from the master cylinder housing is forced against the end of a free leg of the two-legged brake lever that is supported in bearings, free to rotate. When the brake lever is actuated the master cylinder piston is forced into the master cylinder housing against the force of the spring. The vector of the force transmitted from the end of the free leg to the end face of the master cylinder piston has an axial component as well as a radial component with respect to the master cylinder piston. As a result, the free end of the leg slides across the end face of the master cylinder piston each time the brakes are applied, the friction produced by this sliding this requires an increased force to be applied to the brake pedal.

In order to reduce the force on the brake pedal, the John Deere tractors in the 6000 series were equipped with a ball bearing between the brake pedal and master cylinder piston which, however, leads to higher manufacturing costs.

In the passenger car brake installation described in U.S. Pat. No. 4,404,803 a brake rod is used as a connecting link between the brake pedal and the master cylinder piston, which is connected in a joint to the brake pedal and whose free end is configured as a ball which engages a recess in the end face of the master cylinder piston with a pan-shaped bottom in such a way that the brake rod can tilt within a small angular range. This design is intended to avoid assembly tolerances between brake pedal and master cylinder piston and the positive locking force centralized on the master cylinder piston. However this design requires a relatively large amount of space, which is not always available, in particular, in agricultural, logging and construction machines.

SUMMARY OF THE INVENTION

Accordingly, an object of this invention is to provide a brake arrangement of the type defined above in which only small forces are be transmitted which are directed transverse to the axis of the master cylinder piston.

A further object of the invention is to provide such a brake arrangement which is compact.

These and other objects are achieved by the present invention wherein a compensator is provided for coupling a brake lever to a master cylinder piston. The compensator is configured as roller which has a pair of circular disks on opposite sides of a central body. A recess is formed in the brake lever and is open towards the master cylinder piston. The central body of the compensator is a movably received in the recess. The pair of disks are fixed to opposite sides of the body and the disks are engagable with an end face of the master cylinder piston. A portion of the brake lever is positioned between the disks and the distance between the disks is larger than a width of the portion of the brake lever. The central body has a spherical outer surface which is engageable with the brake lever. The compensator is preferably concentric about a central axis.

DETAILED DESCRIPTION

Figure 1:
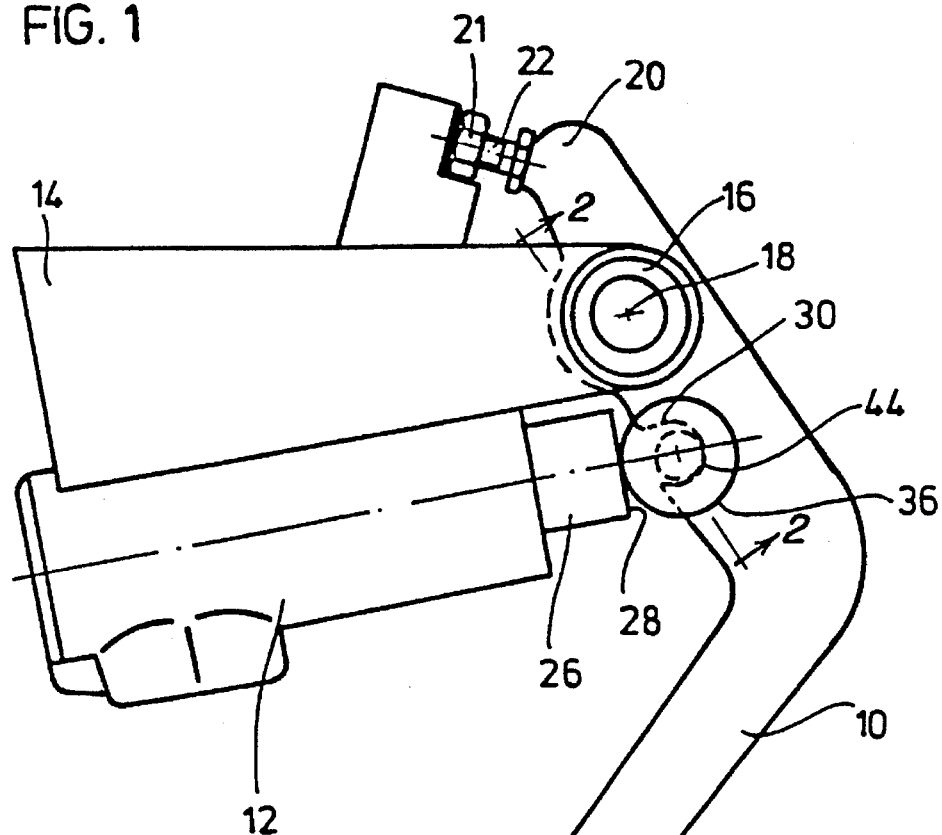
FIG. 1 is a schematic side view of a brake arrangement according to the invention.

The brake arrangement of FIG. 1 includes a brake lever 10 and a master cylinder 12. The master cylinder 12 is fastened to a support 14, indicated schematically, which, for its part, is mounted on a vehicle chassis (not shown). The vehicle (not shown) is preferably an agricultural or utility vehicle, for example, an agricultural tractor.

A free end of the support 14 is provided with a bearing bushing 16, which supports the brake lever 10 for pivoting about a pivot axis 18. The brake lever 10 forms legs which extend from either side of the pivot axis 18. The upper leg has an end region which forms a stop 20 which engages with the hexagonal head of an adjusting screw 22 which is fastened to the support 14 and is secured by a nut 21. Adjusting screw 22 limits the pivoting angle of the brake lever 10 in the counterclockwise direction as seen in FIG. 1. The brake lever 10 has a lower leg which is bent in multiple planes and which has an end region which is provided with a foot operated pedal pad 24.

The master cylinder 12 may be a conventional component as has been described in DE-A-38 37 650. It contains a cylinder bore that is connected to hydraulically operated brakes (not shown) and in which a master cylinder piston 26 is guided. A spring (not shown) is arranged within the cylinder bore and tends to force the master cylinder piston 26 out of the cylinder bore.

Figure 2:
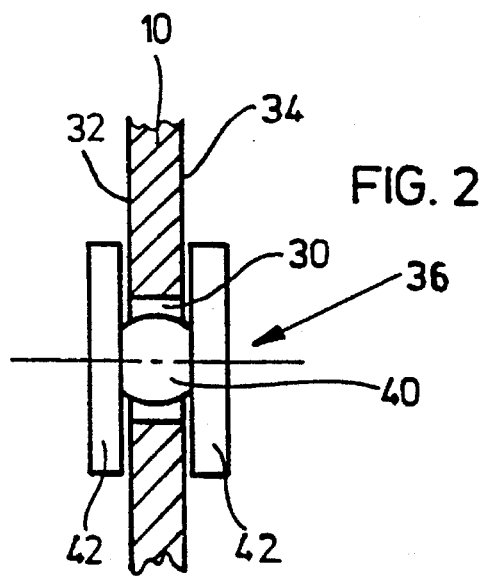
FIG. 2 is an enlarged partial sectional view along lines 2—2 of FIG. 1.

A recess or groove 30 is formed in the lower leg of the brake lever 10 between the pivot axis 18 and the actuating device 24. The groove 30 opens towards the end face 28 of the master cylinder piston 26. As best seen in FIG. 2, at least in this region, the brake lever 10 is configured as a flat component whose side surfaces 32, 34 extend parallel to each other.

Referring now to FIG. 2, a compensator or roller 36 is received by the groove 30. The roller 36 is rotationally symmetric with respect to the axis 38 and includes a central body 40 and a pair of circular parallel disks 42 on opposite sides thereof. The two disks 42 have a larger diameter than the diameter of the body 40. The outer surface of the body 40 is convex forms a portion of a sphere.

The roller 36 is inserted into the groove 30 in such a way that the body 40 is received by the groove 30 and a flat portion of the brake lever 10 is located between the disks 42. To provide freedom of movement for the roller 36 in the groove 30, the distance between the disks 42 is slightly larger than the thickness of the brake lever 10, and the groove 30 is somewhat wider than the central diameter of the body 40.

The circumferential surfaces of the two disks 42 are in contact with the end face 28 of the master cylinder piston 26. The spring force acting upon the master cylinder piston 26 forces the body 40 of the roller 36 against the bottom 44 of the groove 30 and the brake lever 10 is pivoted in the counterclockwise direction until stop 20 comes into contact with the adjusting screw 22, as shown in FIG. 1. Thus, the roller 36 is not secured to either the brake lever 10 or to the master cylinder piston 26, it is merely trapped in the groove 30 between the brake lever 10 and the master cylinder piston 26.

An operator can use his foot to pivot the brake lever 10 in the clockwise direction from the position shown in FIG. 1. Thereby the master cylinder piston 26 is pushed into the cylinder bore against the force of the spring (not shown) to displace hydraulic fluid (not shown) and apply the brakes (not shown). The roller 36 is supported in the groove 30 free to move, hence the roller 36 can compensate a variation in tolerances.

Sliding contact and the transmission of transverse forces to the piston is substantially avoided because the roller 36 can pivot and is able to roll in the somewhat wider groove 30 of the brake pedal 10. Therefore, substantially only axial forces are transmitted to the master cylinder piston 26 and there are only small power losses due to transverse forces. Manufacturing tolerances and bearing clearances of the brake pedal are accomodated. This design is compact and saves space.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A brake arrangement for motor vehicles with a brake lever supported for rotation about a pivot axis, an axially movable master cylinder piston and a compensator for transmitting force from the brake lever to the master cylinder piston, the improvement wherein:

the compensator is trapped between the brake lever and the master cylinder piston, and the compensator is not secured to the brake lever or to the master cylinder piston.

2. The brake arrangement of claim 1, wherein: the compensator is concentric about a central axis.

3. The brake arrangement of claim 1, wherein:

the brake lever includes a recess which is open towards the master cylinder piston; and the compensator comprises a smaller diameter central body movably received in the recess and a pair of larger diameter disks fixed to opposite sides of the body, the disks being engagable with an end face of the master cylinder piston.

4. The brake arrangement of claim 3, wherein:

a portion of the brake lever being positioned between the disks and the distance between the disks being larger than a width of the portion of the brake lever.

5. The brake arrangement of claim 3, wherein:

the central body having a spherical outer surface which is engagable with a surface of the recess.

6. The brake arrangement of claim 3, wherein:

the central body having a spherical outer surface which is engagable with the brake lever.

7. The brake arrangement of claim 3, wherein:

the disks have convex radially outer surfaces; and the central body has a spherical outer surface.

8. The brake arrangement of claim 7, wherein:

the disks have a circular outer surface and have a uniform thickness.

9. The brake arrangement of claim 7, wherein:

the compensator is concentric about a central axis.

\* \* \* \* \*